United States Patent
Tanaya

(10) Patent No.: US 8,291,747 B2
(45) Date of Patent: Oct. 23, 2012

(54) INTERNAL COMBUSTION ENGINE COMBUSTION STATE DETECTION APPARATUS

(75) Inventor: Kimihiko Tanaya, Chiyoda-ku (JP)

(73) Assignee: Mitsubishi Electric Corp., Tokyo (JP)

( * ) Notice: Subject to any disclaimer, the term of this patent is extended or adjusted under 35 U.S.C. 154(b) by 343 days.

(21) Appl. No.: 12/835,354

(22) Filed: Jul. 13, 2010

(65) Prior Publication Data

US 2011/0203358 A1 Aug. 25, 2011

(30) Foreign Application Priority Data

Feb. 23, 2010 (JP) .................................. 2010-037335

(51) Int. Cl.
*G01M 15/04* (2006.01)
(52) U.S. Cl. .................. 73/35.08; 73/114.08; 73/114.67
(58) Field of Classification Search .................. 73/35.07, 73/35.08, 114.08, 114.67
See application file for complete search history.

(56) References Cited

U.S. PATENT DOCUMENTS

| 7,882,730 B2 * | 2/2011 | Tanaya et al. | 73/114.67 |
| 2010/0257921 A1 * | 10/2010 | Tanaya et al. | 73/114.67 |
| 2010/0258081 A1 * | 10/2010 | Tanaya et al. | 123/406.58 |

FOREIGN PATENT DOCUMENTS

| JP | 70-54750 A | 2/1995 |
| JP | 71-67028 A | 7/1995 |
| JP | 10-159699 A | 6/1998 |
| JP | 2008-019738 A | 1/2008 |
| JP | 2009-57940 A | 3/2009 |

OTHER PUBLICATIONS

Japanese Office Action dated Sep. 13, 2011 for corresponding Japanese Application No. 2010-037335.

* cited by examiner

*Primary Examiner* — Eric S McCall
(74) *Attorney, Agent, or Firm* — Sughrue Mion, PLLC

(57) ABSTRACT

A combustion state detection apparatus includes an ion detection device that detects ions generated in a combustion chamber, an end detection device that detects ion signal end timing after spark timing obtained from the ion detection device, and a combustion diagnosis device that sets comparative timing to be compared with the end timing to determine abnormal combustion when the end timing is advanced from the comparative timing. The diagnosis device sets a smoothed value smoothed using various ion signal end timing values to set a ratio of the smoothed value and the spark timing and sets the comparative timing by making the ratio variable at predetermined timing with respect to the smoothed value. Hence, abnormal combustion in the internal combustion engine can be detected without causing a change in detection accuracy even with a change in calibration or environment and matching man hours for abnormal combustion detection can be reduced.

7 Claims, 3 Drawing Sheets

INTERNAL COMBUSTION ENGINE COMBUSTION STATE DETECTION APPARATUS

BACKGROUND OF THE INVENTION

1. Field of the Invention

The present invention relates to an apparatus that detects a combustion state of an internal combustion engine, and more particularly, to an apparatus that detects abnormal combustion.

2. Background Art

Problems of environmental conservation and fuel depletion are being raised in recent years and it is a big issue in the auto industry to cope with these problems. Under these circumstances, a variety of techniques to increase efficiency of an internal combustion engine to the maximum extent possible have been developed. With these techniques, however, abnormal combustion occurs more frequently and there arise problems that the internal combustion engine is damaged and durability and marketability are reduced.

As an apparatus capable of detecting abnormal combustion, an apparatus described in JP-A-2009-57940 is proposed. This apparatus detects the occurrence of pre-ignition and strength thereof according to generation end timing of an ion current, and it is configured to calculate the strength of pre-ignition in accordance with a relational expression of the generation end timing of an ion current and the strength of pre-ignition found empirically in advance.

The apparatus described in the cited reference calculates the strength of pre-ignition in accordance with the relational expression of the generation end timing of an ion current and the strength of pre-ignition found empirically in advance. The generation end timing of an ion current, however, is known to vary with an engine speed of an internal combustion engine, a load, an air-fuel ratio, spark timing, components of fuel, specifications of a detection probe, and other various environmental conditions. Because an actual vehicle is not provided with practical means for detecting the components of fuel and the specification of the detection probe, it is impossible to change a threshold value with which to determine the occurrence of pre-ignition by taking such variance-causing factors into account. This incapability therefore poses a problem that the detection accuracy is deteriorated.

In addition, in order to set the threshold value, albeit unreasonably at some sacrifice of detection, enormous man hours are necessary for examination. Further, there is a problem that more man hours are necessary to adjust the environmental conditions (in particular, temperature and pressure), an amount and timing of fuel injection, spark timing, and so forth in compensating for differences deriving from places of destination of a vehicle incorporating the internal combustion engine, that is, to perform matching again using different engine calibrations.

SUMMARY OF THE INVENTION

The invention has an object to solve the problems discussed above and therefore provides a combustion state detection apparatus capable of not only maintaining a detection performance at an equal level even with a change to some extent in calibration or environment, but also reducing man hours needed for matching markedly.

An internal combustion engine combustion state detection apparatus according to an aspect of the invention includes: a control device that generates a spark signal in an internal combustion engine; an ignition device that ignites and burns a combustible mixture taken into a combustion chamber in a cylinder of the internal combustion engine; an ion current detection device that detects ions generated in the combustion chamber by combustion of the combustible mixture; an end detection device that detects end timing of an ion signal obtained from the ion current after spark timing obtained from the ion current detection device; and a combustion diagnosis device that sets comparative timing to be compared with the end timing of the ion signal and determines that combustion is abnormal when the end timing of the ion signal is advanced from the comparative timing. The combustion diagnosis device sets a smoothed value smoothed using values of various end timings of the ion signal to detect a relation between the smoothed value and the spark timing and sets the comparative timing that varies according to the relation at predetermined timing corresponding to a combustion state with respect to the smoothed value.

The combustion state detection apparatus of the invention is capable of not only detecting abnormal combustion even with a change in calibration or usage environment while stabilizing detection accuracy of abnormal combustion, but also reducing the matching man hours for abnormal combustion detection.

The foregoing and other object, features, aspects, and advantages of the present invention will become more apparent from the following detailed description of the present invention when taken in conjunction with the accompanying drawings.

DESCRIPTION OF THE PREFERRED EMBODIMENT

Hereinafter, one embodiment of the invention will be described with reference to the drawings.

Figure 1:
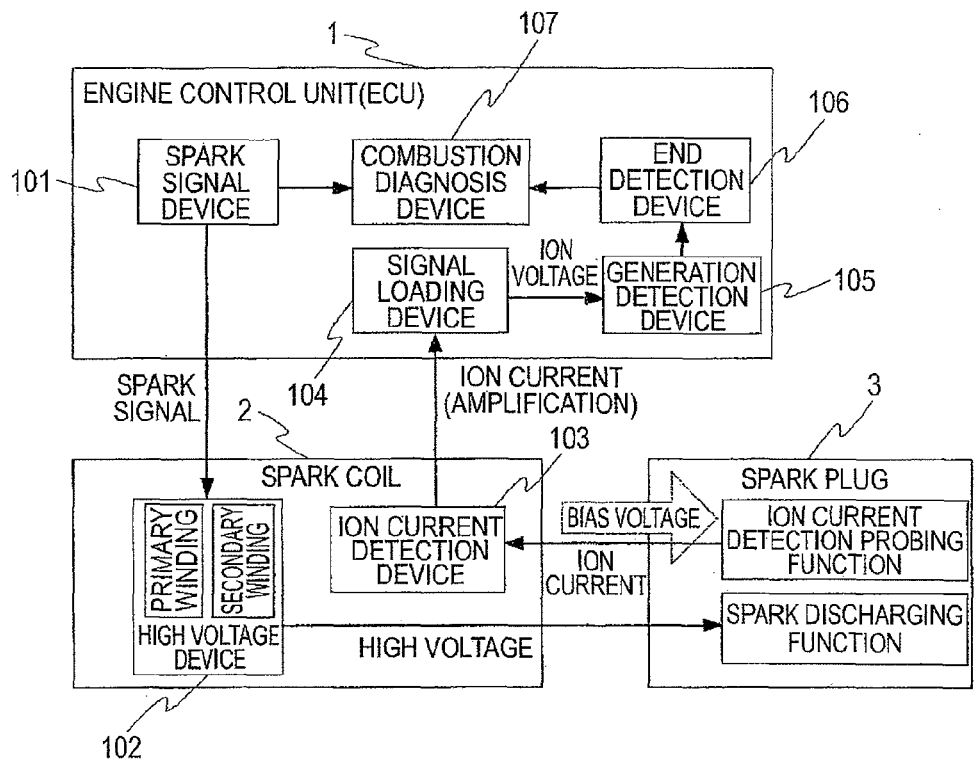
FIG. 1 is a view showing the overall configuration of an apparatus according to one embodiment of the invention.

FIG. 1 is a view showing the overall configuration of an apparatus of the invention. Numeral 1 denotes an engine control unit (ECU) serving as a control device and numerals 2 and 3 denote ignition devices. In particular, numeral 2 denotes a spark coil and numeral 3 denotes a spark plug. A spark signal device 101 in the ECU 1 generates a spark signal, which is the timing to actuate the spark coil 2. When the spark signal switches to a high state, a current (primary current) flows in a primary winding in the spark coil 2 and the spark coil 2 starts to accumulate energy. At the timing (spark timing) at which the spark signal switches from a high state to a low state, the spark coil 2 generates a high voltage at an internal high voltage device 102.

The high voltage generated in the spark coil 2 is sent to the spark plug 3. This high voltage produces a spark discharge resulting from an insulation breakdown between the electrode and the ground (GND) of the spark plug 3. A combustible mixture in the combustion chamber thus ignites and burns. In association with this spark discharge action, an ion current detection device 103 in the spark coil 2 generates a bias voltage, for example, a fixed voltage at about 100 V, used to detect ions generated in association with combustion of the combustible mixture in the combustion chamber and supplies the bias voltage to the spark plug 3 after the spark discharge ends. The spark plug 3 is furnished with not only the spark discharging function but also an ion current detection probing function. The spark plug 3 therefore detects ions generated in association with combustion of the combustible mixture by applying the bias voltage between the electrode and the GND of the spark plug 3.

Ions detected by the spark plug 3 flow as a current from the spark plug 3 via the ion current detection device 103 in the spark coil 2. Hereinafter, this current is referred to as the ion current. The ion current undergoes current amplification in the ion current detection device 103 in the spark coil 2 and is transmitted further to a signal loading device 104 in the ECU 1.

The signal loading device 104 converts the ion current loaded therein to an ion signal (voltage) in the form of a voltage processable by a micro computer and applies thereon denoising by means of a median filter or the like. The ion signal is transmitted to a combustion diagnosis device 107 by way of a generation detection device 105 and an end detection device 106. Herein, in order to detect abnormal combustion, the generation detection device 105 has been monitoring timing at which the ion signal is generated since before main spark timing described below. Because the ion signal cannot be detected while the spark coil 2 is producing a spark discharge by sparking, in a case where the generation of the ion signal starts immediately before the main spark timing, the ion signal disappears soon after it is generated, that is to say, it is generated as a noise signal and is therefore removed by processing, such as the median filter. Accordingly, there is a case where the generation of the ion signal is imperceptible. To overcome this inconvenience, by inhibiting filtering, such as the median filter, immediately before the main spark timing, for example, within a 0.3-ms section, it becomes possible to enhance a detection performance of abnormal combustion. The combustion diagnosis device 107 further loads therein information on sparking from the spark signal device 101 and makes a diagnosis on combustion on the basis of the loaded information.

The signal loading device 104 controls a rate at which the ion current is converted to a voltage signal. For example, it is typical to let the ion signal pass through an A-to-D converter so that the resulting signal can be processed by a micro computer. The signal loading device 104 converts the ion current to a voltage value ranging from 0 V to 5 V. However, the ion current becomes larger, for example, as the engine speed increases, and the ion current is in a state in which it exceeds 5 V when converted to a voltage using a constant conversion rate. Hence, there is a case where the resulting signal is saturated at 5 V. To avoid such an inconvenience, the signal loading device 104 is furnished with a function of monitoring a saturation state of the signal and making an adjustment to prevent the signal from being saturated by lowering the current-to-voltage conversion rate when it determines that the signal is saturated frequently.

Further, in a case where the signal is still saturated even when the conversion rate is lowered, for example, in a case where an ion signal at a saturation level (for example, 5 V) is generated frequently immediately after the spark signal switches to a high state, the signal loading device 104 determines that there is a leak path of a large current in an ion detection path. The combustion diagnosis device 107 thus inhibits a diagnosis on combustion. Alternatively, in a case where the ion signal detected after the spark discharge at the spark plug 3 is saturated and such a state occurs in succession, the signal loading device 104 determines that an abnormal amount of an alkaline metal substance is mixed into the fuel. The combustion diagnosis device 107 thus inhibits a diagnosis on combustion.

It may be configured in such a manner that the signal loading device 104 switches the conversion rates between a high state and a low state of the spark signal with which an applied voltage used to detect ions varies significantly.

Figure 2:
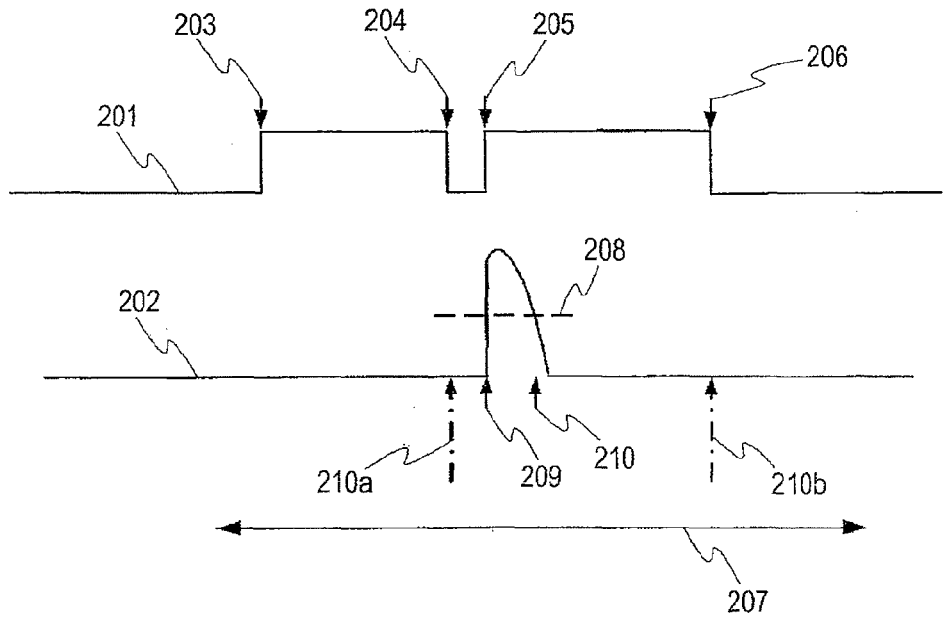
FIG. 2 is a view showing an ion current waveform according to the embodiment.

FIG. 2 shows an example of signal waveforms. A signal 201 denotes the spark signal and a signal 202 denotes the ion signal. The abscissa is used for a crank angle or a time and the ordinate is used for a voltage value. Timing 203 and timing 205 indicate energization start timing of a primary current. Timing 204 and timing 206 indicate de-energization timing of the primary current. A detection and processing section of the ion signal includes the first energization start timing 203 and the last de-energization timing 206 and it is set as a section 207 of FIG. 2.

Herein, the spark signal device 101 supplies a multi-spark signal 201 as is shown in FIG. 2 to the spark coil 2 in order to enhance a combustion diagnosis performance. The main spark timing in this case is the timing 204 and substantially sacrifice fire is produced at the timing 206. By starting energization of the primary current again at the timing 205 after an elapse of a certain period, for example, about 0.05 to 2 ms, from the main spark timing 204, it becomes possible to forcedly end a spark discharge, which occurred at the main spark timing 204, at the timing 205. Although noises are generated, the ion signal can be detected from the timing 205.

By increasing a compression ratio in order to increase heat efficiency of the internal combustion engine, a voltage required for a spark discharge (insulation breakdown in a spark plug gap) becomes larger. It thus becomes necessary to charge larger energy to the spark coil 2. Consequently, a spark discharge has a characteristic that the spark discharge time is long, for example, about 2 to 2.5 ms as the standard value. Further, there may be a case where ringing noises are generated in the ion current signal for about 0.5 ms immediately after the end of the spark discharge, and the ion signal cannot be detected in a section substantially as long as about 3 ms since the main spark timing 204. By contrast, because a combustion speed of abnormal combustion is extremely high, generation of the ion signal indicating a combustion state in the vicinity of the center electrode of the spark plug 3 is extremely steep and short. Accordingly, there is a case where the ion signal is generated and ends within 3 ms since the main spark timing 204 and it becomes impossible to discriminate between a misfire and abnormal combustion. In other words, there is a serious problem that the characteristic of a spark discharge interferes with achievement of a detection of abnormal combustion in an internal combustion engine with a high compression ratio where a detection of abnormal combustion is critically necessary. This problem, however, can be solved by forcedly ending the spark discharge period by starting re-energization of the primary current as described above.

The generation timing and the end timing of the ion signal are extracted from the ion signal made detectable as described above as parameters correlative to an abnormal combustion state. Initially, the generation timing of the ion signal is detected by the generation detection device 105. The generation timing of the ion signal can be obtained as timing 209 at which the ion signal 202 exceeds a threshold value 208 of FIG. 2.

Subsequently, the end timing of the ion signal is detected by the end detection device 106. The end timing of the ion signal is executed after the generation of the ion signal is determined by the generation detection device 105 and obtained as timing 210 at which the ion signal 202 drops again below the threshold 208 of FIG. 2. Timing to be compared is set according to the end timing 210 and an abnormal combustion detection is performed on the basis of a relation with the comparative timing. The comparative timing is varied from 210*a* to 210*b* as is shown in FIG. 2 according to a running condition of the internal combustion engine to stabilize accuracy of the abnormal combustion detection.

Because the comparative timing is set according to the end timing 210, it is preferable to detect the end timing not only in abnormal combustion but also in normal combustion. The intention of this configuration is to capture an abnormal state as a change from a normal state. However, as has been described above, there is a period of about 3 ms after the timing 206, during which the ion signal cannot be detected. Hence, there may be a case where the end timing 210 falls in this period depending on the running condition, which makes it impossible to detect the end timing precisely. In order to avoid this problem, timing and a period of re-energization are selected so that the end timing 210 in normal combustion falls between the timings 205 and 206. Because the end timing 210 varies with the running condition, the foregoing can be satisfied by extending a time of re-energization (section from the timing 205 to the timing 206), or increasing the number of re-energizations (a time from re-energization to re-energization is made as short as possible). In this case, there may be no problem with a performance of a short time. However, in a case where an operation of a long time is involved, considerable heat generation occurs at the spark coil 2 and the spark coil 2 may possibly be broken. It is therefore preferable to set the time of re-energization to 2 ms or shorter. In order to satisfy the foregoing requirement in this time of re-energization, an initial discharge period (section from the timing 204 to the timing 205) is varied according to an independent parameter determined by the engine speed, the load, the spark timing, and so forth. Accordingly, an adjustment can be made for the timing 206 to come later than the end timing 210. The detection is thus enabled.

When the generation timing 209 of the ion signal is advanced from the main spark timing 204 or when the end timing 210 of the ion signal is advanced from the comparative timing, the combustion diagnosis device 107 determines the occurrence of abnormal combustion. Subsequently, a manner by which the comparative timing is determined in the combustion diagnosis device 107 will be described with reference to the flowchart of FIG. 3 and the timing chart of FIG. 4.

Figure 3:
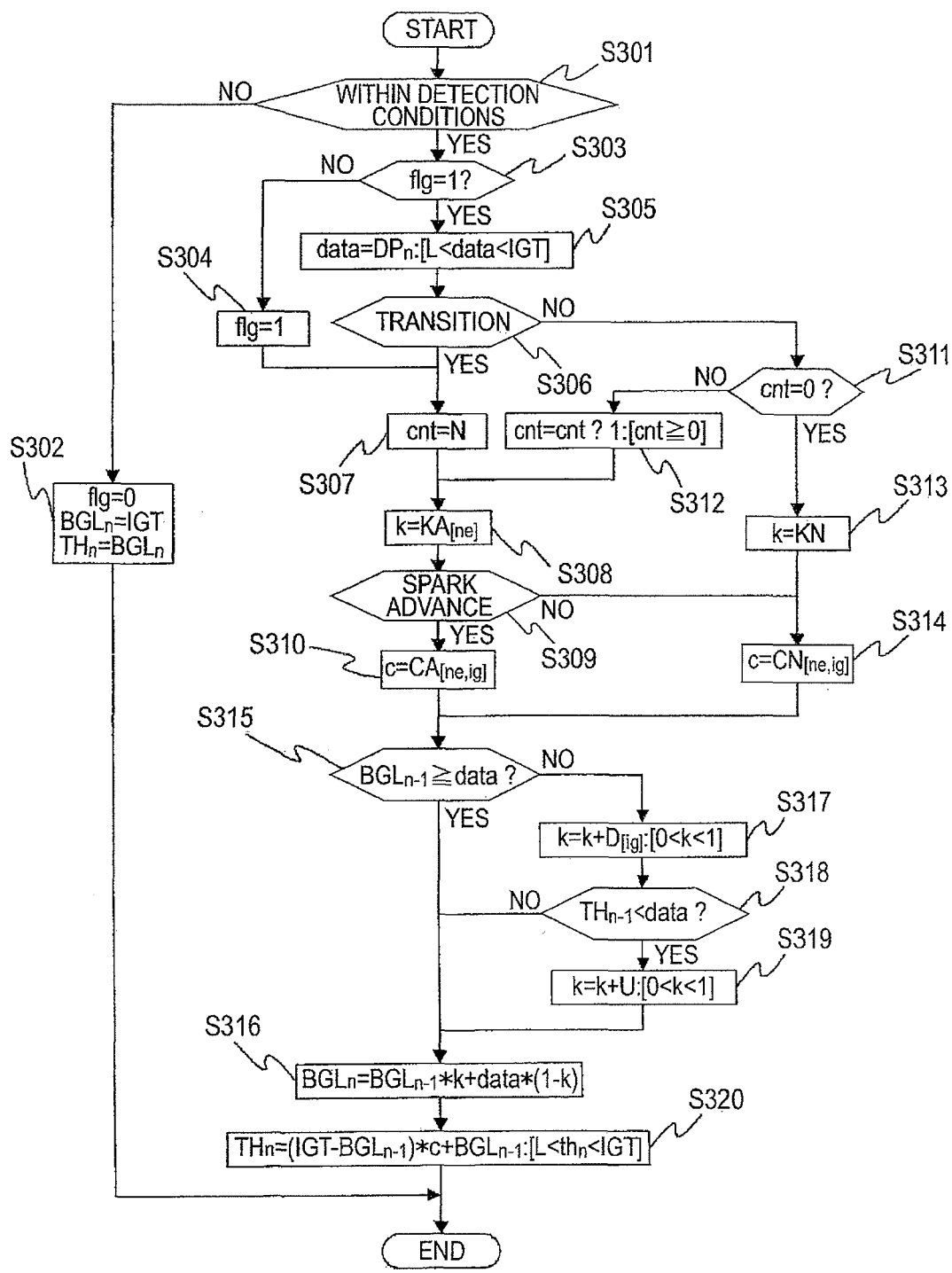
FIG. 3 is a flowchart depicting a combustion detection process according to the embodiment.
Figure 4:
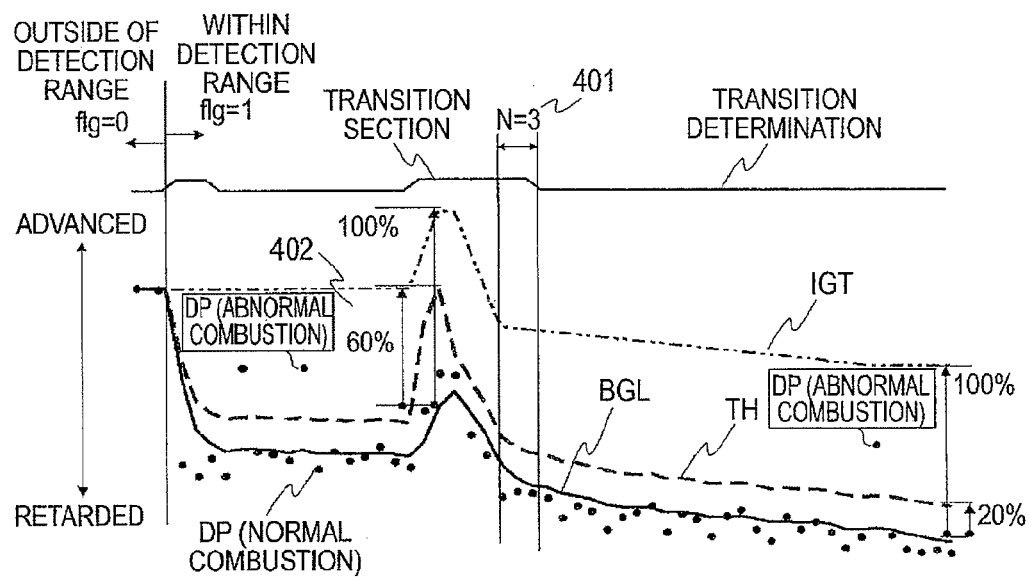
FIG. 4 is a timing chart indicating a detection threshold value according to the embodiment.

In S301 of FIG. 3, whether the current state falls within the conditions to detect abnormal combustion is determined first. The term, "within the conditions", referred to herein means, for example, a running state in a high load and low engine speed region. When the current state is outside of the conditions (N), the flow proceeds to S302. The operation ends after flg=0, $BGL_n$=IGT, and $TH_n$=$BGL_n$ are set. Herein, flg is a flag used to determine whether the current state has just fallen within the conditions from the outside, IGT is the main spark timing (204 of FIG. 2), $BGL_n$ is a value of the end timing (hereinafter, referred to as DP) of the ion signal obtained this time and smoothed using, for example, a moving average, and $TH_n$ is a comparative timing value obtained this time to be compared with DP. This relation is schematically shown in FIG. 4 in which the foregoing factors are represented by IGT, TH, BGL, and DP.

In a case where the current state falls within the conditions to detect abnormal combustion (Y) in S301 of FIG. 3, the flow proceeds to S303 to check the state of flg. When flg≠1 (N), it is determined that the current state has just fallen within the detection conditions from the outside and the flow proceeds to S304. Thereafter, processing same as the processing carried out when the current state is determined as being a transition state is carried out, and a description will be given below where the transition processing will be described.

In a case where flg=1 (Y) in S303, it is determined that the current state has not just fallen within the detection conditions and the flow proceeds to S305. In S305, $DP_n$ of this time is stored to data. Thereafter, BGL is found using the data. It should be noted, however, that an upper limit value and a lower limit value are provided to the data to prevent BGL from increasing and decreasing unnecessarily. Herein, IGT is given as the upper limit value and L is given as the lower limit value, and L sets the last de-energization timing, that is, the timing 206 of FIG. 2.

Subsequently, the flow proceeds to S306 and it is determined whether the current state is a transition state. Subjects to be checked for transition determination are the engine speed, the load, the charging efficiency, and the spark timing and abrupt variances thereof mean a transition state. Accordingly, determination as being the transition state is made when there is an abrupt variance in at least one of these subjects. Hence, in a case where the current state is a transition state (Y), the flow proceeds to S307 and cnt=N is set. Herein, N is a counter that sets a section of a predetermined number of sparks, for example, a 3-spark section. The transition state is handled as it is continuing in the N-spark section since the end of state that is determined as being a transition state, so that BGL or the like is allowed to follow and stabilize. This situation is represented by 401 of FIG. 4. Herein, three sparks are determined as being a transition state.

Subsequently, in S308, KA is substituted to a smoothing coefficient k in the moving average. KA is a coefficient for advance transition and indicates a map value of the engine speed. For example, it is set to a value, such as 0.5, and by setting a value smaller than a coefficient value for steady time, following to a change in the data is accelerated. In other words, in a case where when the current state has just fallen within the detection conditions in S301 or becomes the transition state, the responsivity is increased in comparison with a steady state. Owing to this processing, not only is it possible to prevent an erroneous determination, but it is also possible to ensure the stability of abnormal detection accuracy. A behavior of BGL in the transition state is shown in the transition section of FIG. 4 and BGL shows a steep variance in the transition state.

Subsequently, in a case where a change to advance the spark timing is included in the determination of transition (Y) in S309, the flow proceeds to S310 and a threshold value ratio for advance transition is selected as c=CA to prevent an erroneous determination. Herein, c is a value indicating a ratio that takes a value between 0 and 1, and it is a variable indicating at which ratio of BGL and IGT the threshold value (TH) of an abnormal combustion determination is to be set. CA is a map value of the engine speed and the spark timing. For example, given c=0.6 during a spark advance transition, as indicated by 402 of FIG. 4, TH is set closer to IGT than BGL. This processing also prevents an erroneous determination and by constantly making the threshold value variable, BGL is suppressed from exceeding TH of FIG. 4 to be on the upper side of the drawing (abnormal region). Referring to FIG. 4, let TDC (top dead center) be at 0 degree and the downward direction of the drawing be a minus direction.

Meanwhile, in a case where the current state is determined as not being a transition state (N) in S306, the flow proceeds to S311. Herein, when the counter cnt set in S307 is not 0 (N), the flow proceeds to S312 and proceeds to S308 after cnt is decremented by one. When cnt is 0 (Y) in S311, the flow proceeds to S313 and k=KN is set so that the smoothing coefficient value for steady state takes, for example, about 0.8. The flow then proceeds to S314 and the value CN for steady state is substituted to the ratio of the threshold value, c. Herein, CN is also a map value of the engine speed and the spark timing.

Subsequently, in S315, a determination is made to adjust a variance of BGL. Initially, in a case where the data is smaller than the last $BGL_{n-1}$ (Y), the flow proceeds to BGL calculation processing in S316. In a case where the data is larger than $BGL_{n-1}$ (N), the flow proceeds to S317 and a correction amount D is added to the smoothing coefficient k. Herein, by using a negative value as the correction amount, it becomes possible to allow BGL to vary on the higher side in the DP distribution. Conversely, by setting a positive value as the correction amount, it becomes possible to allow BGL to vary on the lower side in the DP distribution. Under the condition such that DP increases and decreases considerably, an erroneous detection can be prevented by setting a negative value to D. It is preferable to set D as a map value of the engine speed and IGT.

The flow subsequently proceeds to S318 and in a case where the data is further advanced from $TH_{n-1}$ (Y), the flow proceeds to S319 and a correction amount U is added to the smoothing coefficient k. Normally, a positive value is given to U to prevent BGL from increasing unnecessarily. A case where the data is advanced from $TH_{n-1}$ means a state where abnormal combustion is occurring. When BGL is calculated using the abnormal combustion data intact, there is a risk that BGL increases to the vicinity of a value indicting abnormal combustion. In this case, the detection accuracy of abnormal combustion is deteriorated. Hence, in such a case, a correction is made for the smoothing coefficient to increase so that an unnecessary variance of BGL is suppressed. Alternatively, in such a case, the data may be simply removed from the BGL computation. Because the smoothing coefficient has to be a value in a range of 0 to 1, clipping is added in S317 and S319 so that the smoothing coefficient does not take a value outside of this range.

In S316, the BGL calculation processing is carried out using the value of the smoothing coefficient k determined thus far as the coefficient that multiplies the last $BGL_{n-1}$. Finally, in S320, the final threshold value $TH_n$ is calculated using $BGL_{n-1}$, the threshold value ratio c, and IGT determined thus far. It should be noted, however, that because TH has to be a value in a range of the lower limit value L to IGT, clipping is added so that TH does not take a value outside of this range, after which the flow of the process ends. In FIG. 4, BGL indicates that it takes a moving average value according to the respective DP values. Also, the threshold value TH is calculated by BGL and IGT and indicates an abrupt variance with the influences of BGL being suppressed to the least possible extent in a region that falls within the detection range and in the transition state.

Figure 5:
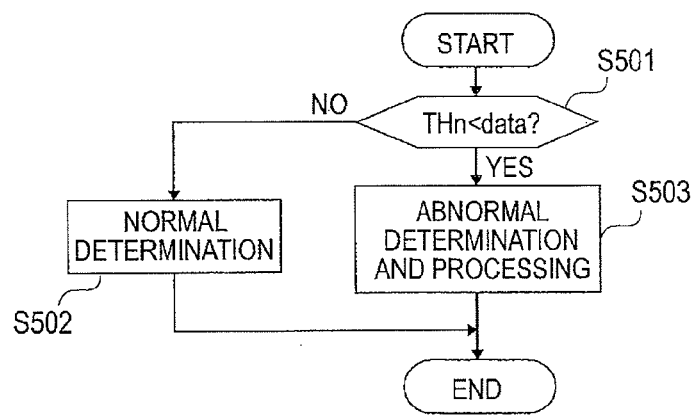
FIG. 5 is a flowchart depicting an abnormal detection process according to the embodiment.

The abnormal detection process depicted in FIG. 5 will now be described. In S501, the variable threshold value TH found in FIG. 3 is compared with the latest data. In a case where the data is smaller than TH, that is, the data is retarded from TH (N), the flow proceeds to S502 and the current state is determined as being normal combustion. On the contrary, in a case where data >TR, that is, the data is advanced from TH (Y) in S501, the flow proceeds to S503 and the current state is determined as being abnormal. When the current state is determined as being abnormal combustion, it becomes necessary to correct the control of the internal combustion engine so that abnormal combustion is not spread any further. For example, the compression ratio of the internal combustion engine is lowered by delaying opening timing of an input valve. By performing control to increase a fuel amount, to lower the temperature of the internal combustion engine itself by delaying the fuel injection timing, and ultimately, to interrupt the fuel injection, abnormal combustion is suppressed and normal combustion is restored.

In the description above, TH is found as a ratio of the BGL and IGT. Besides this configuration, although the matching man hours are increased to some extent, a close advantage can be obtained by using a value obtained by offsetting BGL by a predetermined amount as TH. An offset amount can be a map value corresponding to the spark timing or the like.

Also, the initial value of BGL, that is, in a case where the current state is outside of the detection range, BGL=IGT is given. However, because an ion current is generated at and after the time point of IGT, it is possible to enhance the responsivity in a case where the current state falls within the detection range by setting the retard value rather than IGT as the initial value.

Also, in a case where the current state is determined as being abnormal combustion, the BGL calculation itself in S316 of FIG. 3 is interrupted. Alternatively, by setting the coefficient, (1−k), to a value as small as possible, it becomes possible to carry out the process so that the data, which is being subjected to determination of abnormal combustion, does not give influences to BGL. Also, as the moving average used to smooth BGL, various average value calculation methods, such as simple moving average, weighted moving average, and exponential moving average, can be adopted.

As has been described, according to the apparatus of the invention, it becomes possible to maintain the detection performance at the equal level even with a change to some extent in calibration or environment and the matching man hours can be reduced markedly. A target internal combustion engine efficiency can be thus obtained at a high degree of accuracy. The invention, therefore, is useful for problems of fuel depletion and environment conservation.

The combustion state detection apparatus of the invention is incorporated into an automobile, a two-wheel vehicle, an outboard engine, and other specialized vehicles using an internal combustion engine, so that the internal combustion engine is run efficiently. The combustion state detection apparatus of the invention is therefore useful for problems of fuel depletion problem and environment conservation.

Various modifications and alterations of this invention will be apparent to those skilled in the art without departing from the scope and spirit of this invention, and it should be understood that this is not limited to the illustrative embodiments set forth herein.

What is claimed is:

1. An internal combustion engine combustion state detection apparatus, comprising:
   a control device that generates a spark signal in an internal combustion engine;
   an ignition device that ignites and burns a combustible mixture taken into a combustion chamber in a cylinder of the internal combustion engine;
   an ion current detection device that detects ions generated in the combustion chamber by combustion of the combustible mixture;
   an end detection device that detects end timing of an ion signal obtained from the ion current after spark timing obtained from the ion current detection device; and
   a combustion diagnosis device that sets comparative timing to be compared with the end timing of the ion signal and determines that combustion is abnormal when the end timing of the ion signal is advanced from the comparative timing, wherein the combustion diagnosis device sets a smoothed value smoothed using values of various end timings of the ion signal to detect a relation between the smoothed value and the spark timing and sets the comparative timing that varies according to the relation at predetermined timing corresponding to a combustion state with respect to the smoothed value.

2. The internal combustion engine combustion state detection apparatus according to claim 1, wherein:

the comparative timing is set by setting a ratio of the smoothed value and the spark timing and by making the ratio to be taken into account variable at the predetermined timing corresponding to the combustion state with respect to the smoothed value.

3. The internal combustion engine combustion state detection apparatus according to claim 2, wherein:

the combustion diagnosis device determines a transition state according to at least one of the spark timing, an engine speed, a load, and a charging efficiency, and changes the ratio more significantly in the transition state than in other states.

4. The internal combustion engine combustion state detection apparatus according to claim 1, wherein:

the combustion diagnosis device determines a transition state according to at least one of the spark timing, an engine speed, a load, and a charging efficiency, and makes a response speed of the smoothed value faster in the transition state than in other states.

5. The internal combustion engine combustion state detection apparatus according to claim 1, wherein:

the combustion diagnosis device operates in one of a manner so that a value of the end timing of the ion signal determined as being abnormal combustion does not give influences to the smoothed value and a manner so that the influences are suppressed.

6. The internal combustion engine combustion state detection apparatus according to claim 1, wherein:

the combustion diagnosis device does not perform a process in a circumstance where it is determined that there is no need to detect a combustion state and sets the smoothed value to one of a predetermined constant and a predetermined spark timing value.

7. The internal combustion engine combustion state detection apparatus according to claim 1, wherein:

the control device generates the spark signal of the internal combustion engine more than once in one of a single compression stroke and a single combustion stroke and changes an interval between a first spark signal and a second spark signal according to at least one of combustion control parameters including an engine speed of the internal combustion engine, a load, and the spark timing.

* * * * *